US012587097B2

(12) United States Patent
Cheng et al.

(10) Patent No.: US 12,587,097 B2
(45) Date of Patent: Mar. 24, 2026

(54) CONTROL CIRCUIT AND CONTROL METHOD FOR MULTIPHASE POWER SUPPLY AND MULTIPHASE POWER SUPPLY

(71) Applicant: Joulwatt Technology Co., Ltd., Hangzhou (CN)

(72) Inventors: Yang Cheng, Hangzhou (CN); Siyun Wang, Hangzhou (CN)

(73) Assignee: JOULWATT TECHNOLOGY CO., LTD., Hangzhou (CN)

( * ) Notice: Subject to any disclaimer, the term of this patent is extended or adjusted under 35 U.S.C. 154(b) by 307 days.

(21) Appl. No.: 18/195,353

(22) Filed: May 9, 2023

(65) Prior Publication Data

US 2023/0361681 A1 Nov. 9, 2023

(30) Foreign Application Priority Data

May 9, 2022 (CN) .......................... 202210501618.0

(51) Int. Cl.
*H02M 3/158* (2006.01)
*H02M 1/088* (2006.01)
(Continued)

(52) U.S. Cl.
CPC ......... *H02M 3/1584* (2013.01); *H02M 1/088* (2013.01); *H02M 1/14* (2013.01); *H02M 3/157* (2013.01)

(58) Field of Classification Search
CPC ............ H02M 3/02; H02M 3/04; H02M 3/10; H02M 3/135; H02M 3/137; H02M 3/139; H02M 3/142; H02M 3/145; H02M 3/155; H02M 3/1552; H02M 3/156; H02M 3/1563; H02M 3/1566; H02M 3/157;
(Continued)

(56) References Cited

U.S. PATENT DOCUMENTS 6,137,274 A * 10/2000 Rajagopalan ........... H02J 1/102
323/272
6,674,274 B2 * 1/2004 Hobrecht ............ H02M 3/1584
323/284
2022/0393464 A1 * 12/2022 Venugopal ............ H02M 3/285

FOREIGN PATENT DOCUMENTS

CN 108063554 A 5/2018
CN 115149803 A 10/2022

* cited by examiner

*Primary Examiner* — Thienvu V Tran
*Assistant Examiner* — Carlos O Rivera-Perez
(74) *Attorney, Agent, or Firm* — Treasure IP group, LLC

(57) ABSTRACT

The present disclosure discloses a control circuit and a control method for a multiphase power supply and the multiphase power supply. The control circuit includes a current reference signal generator and a controller. The current reference signal generator is configured to adjust a first compensation signal according to a first scaling factor and a first voltage signal, so that the first compensation signal follows the first voltage signal in a steady state, and a current reference signal is obtained according to the first compensation signal and the first voltage signal. The controller is configured to obtain a control signal for each phase power conversion circuit according to the current reference signal to control each phase power conversion circuit to provide a power output to a load. The present disclosure can improve a phase-conversion stability of the multiphase power supply, and can achieve fast and accurate control of the multiphase power supply.

18 Claims, 4 Drawing Sheets

(51) Int. Cl.
　　　*H02M 1/14*　　　　(2006.01)
　　　*H02M 3/157*　　　(2006.01)
(58) Field of Classification Search
　　　CPC .. H02M 3/158; H02M 3/1582; H02M 3/1584;
　　　　　　　　H02M 3/1586; H02M 3/1588; H02M
　　　　　　　　1/0003; H02M 1/0009; H02M 1/0016;
　　　　　　　　H02M 1/0019; H02M 1/0025; H02M
　　　　　　　　1/0043; H02M 1/0067; H02M 1/0093;
　　　　　　　　　H02M 1/084; H02M 1/0845; H02M
　　　　　　　　　　　　　　　1/088; H02M 1/14
　　　USPC ........ 323/212–219, 222–224, 265, 268–275,
　　　　　　　　323/277, 280–285, 304, 311, 316, 351;
　　　　　　　　　　　　363/36, 65, 74, 79, 123, 124
　　　See application file for complete search history.

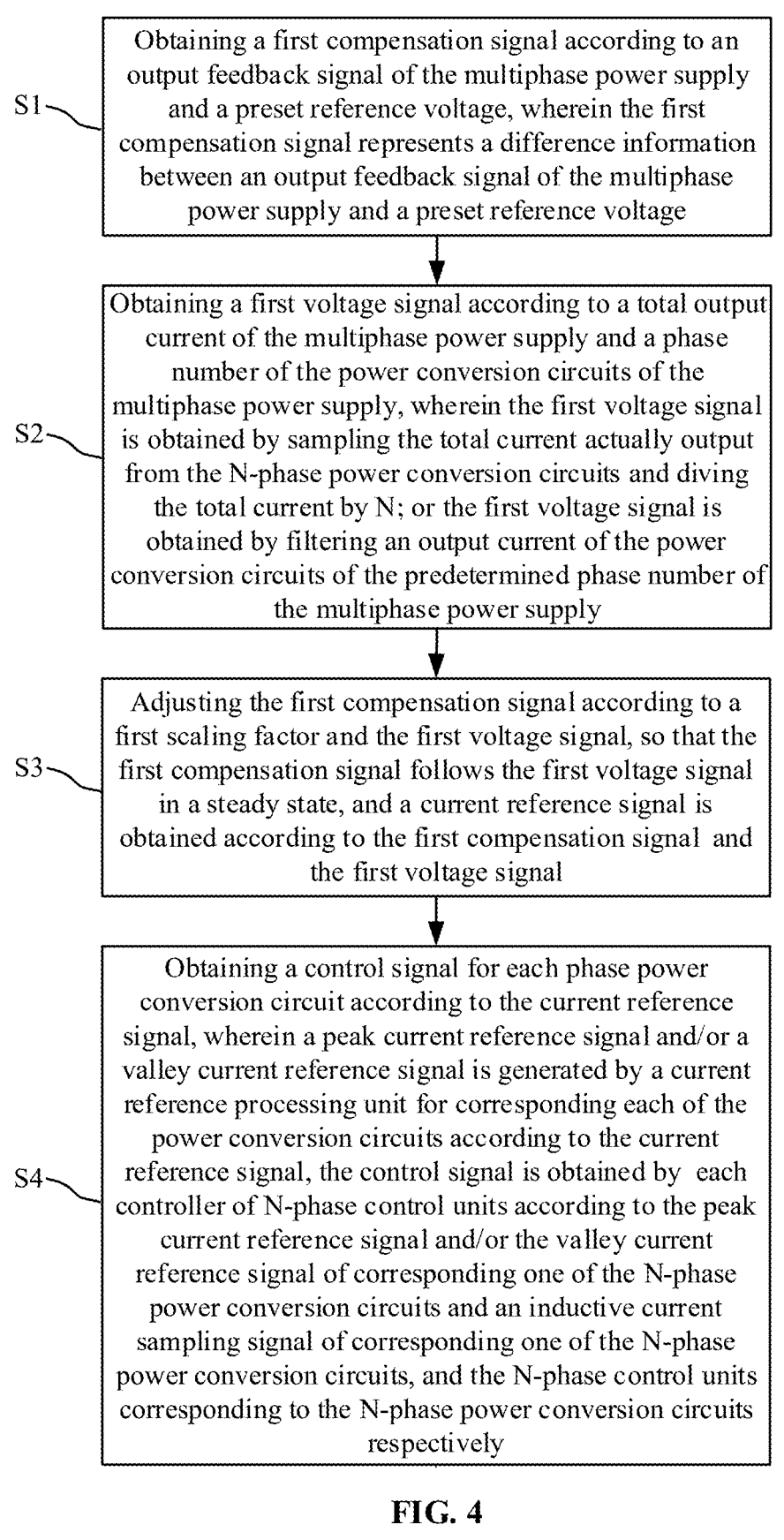

S1 — Obtaining a first compensation signal according to an output feedback signal of the multiphase power supply and a preset reference voltage, wherein the first compensation signal represents a difference information between an output feedback signal of the multiphase power supply and a preset reference voltage S2 — Obtaining a first voltage signal according to a total output current of the multiphase power supply and a phase number of the power conversion circuits of the multiphase power supply, wherein the first voltage signal is obtained by sampling the total current actually output from the N-phase power conversion circuits and diving the total current by N; or the first voltage signal is obtained by filtering an output current of the power conversion circuits of the predetermined phase number of the multiphase power supply S3 — Adjusting the first compensation signal according to a first scaling factor and the first voltage signal, so that the first compensation signal follows the first voltage signal in a steady state, and a current reference signal is obtained according to the first compensation signal and the first voltage signal S4 — Obtaining a control signal for each phase power conversion circuit according to the current reference signal, wherein a peak current reference signal and/or a valley current reference signal is generated by a current reference processing unit for corresponding each of the power conversion circuits according to the current reference signal, the control signal is obtained by each controller of N-phase control units according to the peak current reference signal and/or the valley current reference signal of corresponding one of the N-phase power conversion circuits and an inductive current sampling signal of corresponding one of the N-phase power conversion circuits, and the N-phase control units corresponding to the N-phase power conversion circuits respectively

FIG. 4

CONTROL CIRCUIT AND CONTROL METHOD FOR MULTIPHASE POWER SUPPLY AND MULTIPHASE POWER SUPPLY

CROSS REFERENCE TO RELATIONED APPLICATIONS

This application claims priority to the Chinese Patent Application No. 202210501618.0, filed on May 9, 2022, entitled "control circuit and control method for multiphase power supply and multiphase power supply", and published as CN115250055A on Oct. 28, 2022, which is incorporated herein by reference in its entirety in this disclosure.

FIELD OF TECHNOLOGY

The present disclosure relates to a field of power converter, and in particular, to a control circuit and a control method for a multiphase power supply and the multiphase power supply.

DESCRIPTION OF THE RELATED ART

Nowadays, a driving voltage of electronic components, such as central processor and memory, is gradually decreasing, and a tolerance range for voltage ripple is reduced accordingly. However, power consumption of the electronic components does not decrease by the same amount at the same time, causing a current required for operation to rise instead, and the larger current will cause larger voltage ripple. In order to solve the above problems, a multiphase conversion circuit (i.e., multiphase switching power supply) architecture has been developed, so that the current is distributed by multiple converter circuits to provide. Compared with a single-phase conversion circuit architecture, the multiphase converter circuit architecture not only has excellent performance in voltage ripple elimination, but also has better advantages in dynamic response, output ripple current elimination, and heat dissipation.

FIG. 1 is a schematic diagram of a multiphase power supply of a prior art. As shown in FIG. 1, the multiphase power supply 100 includes: a multiphase power supply control circuit 110, power conversion circuits 101 to 10N (N is an integer greater than or equal to 1) connected in parallel, and a feedback control circuit 120. Each phase power conversion circuit includes a driver, switching devices T1 and T2, and an inductor Lx, wherein the switching devices T1 and T2 are connected between an input voltage Vin and a reference ground, a first terminal of the inductor Lx is connected with a middle node of the switching devices T1 and T2, a second terminal is connected with a first terminal of an output capacitor Cout, and a second terminal of the output capacitor Cout is grounded. The drivers in the power conversion circuits 101 to 10N of each phase respectively receive control signals, e.g. pulse width modulation signals PWM1 to PWMN, provided by the multiphase power supply controller 110, and control on and off of corresponding switching devices according to the control signals that received, so as to charge energy storage elements of the phase for a corresponding time period to generate output voltages Vo1 to VoN of the phase, and the output voltages Vo1 to VoN are combined into an output voltage Vout and drive a load based on the output capacitor Cout. The multiphase power supply control circuit 110 includes a plurality of controllers 111-11N, each of which serves a first compensation signal Vc1 output from the feedback control circuit 120 as a respective current reference signal, and further achieves on-off control of each of the switching devices T1 and T2 according to a comparison result of the respective inductive current and the current reference signal Vc1.

An existing control method for the multiphase power supply cannot achieve fast control related to average current of the multiphase power supply, and when the multiphase power supply is subjected to phase-conversion change (for example, a predetermined phase number of the power conversion circuits that is actually turned on is changed), the existing control method cannot quickly respond to the change of the predetermined phase number, which is not beneficial to achieving accurate control of the multiphase power supply.

Therefore, there is a need to provide an improved technical solution to overcome the above technical problems in the prior art.

SUMMARY OF THE INVENTION

In order to solve the above technical problems, the present disclosure provides a control circuit and a control method for a multiphase power supply, and the multiphase power supply, wherein a first compensation signal may be adjusted according to a phase number of power conversion circuits that are actually turned on in the multiphase power supply and an average value of a total output current of the multiphase power supply relative to the predetermined phase number of the power conversion circuits of the multiphase power supply, which can improve a phase-conversion stability of the multiphase power supply, and can achieve fast and accurate control of the multiphase power supply.

According to a first aspect of the present disclosure, there is provided a control circuit for a multiphase power supply which includes N-phase power conversion circuits, N is a predetermined phase number of the multiphase power supply, and N is an integer greater than or equal to 1, including:

a current reference signal generator configured to adjust a first compensation signal according to a first scaling factor and a first voltage signal, so that the first compensation signal follows the first voltage signal in a steady state, and a current reference signal is obtained according to the first compensation signal and the first voltage signal;

a controller configured to obtain a control signal for each phase power conversion circuit according to the current reference signal to control each phase power conversion circuit to provide a power output to a load, wherein the first compensation signal represents difference information between an output feedback signal of the multiphase power supply and a preset reference voltage, the first scaling factor represents information about the ratio of the predetermined phase number of the power conversion circuits of the multiphase power supply and a phase number of the power conversion circuits that are turned on in the multiphase power supply, and the first voltage signal represents information about the average value of a total current of the multiphase power supply relative to the predetermined phase number of the power conversion circuits of the multiphase power supply.

Optionally, the first voltage signal is obtained by sampling the total current actually output from the N-phase power conversion circuits and diving the total current by N;

or the first voltage signal is obtained by filtering an output current of the power conversion circuits of the predetermined phase number of the multiphase power supply.

Optionally, the predetermined phase number of the power conversion circuits of the multiphase power supply is equal to or greater than the phase number of the power conversion circuits that are turned on in the multiphase power supply.

Optionally, the current reference signal generator includes:

a voltage converter for receiving the first compensation signal, wherein the voltage converter is configured to perform voltage conversion on the first compensation signal according to the first scaling factor to obtain a first node signal;

a voltage regulation unit connected with an output terminal of the voltage converter, wherein the voltage regulation unit is configured to obtain a voltage regulation signal according to the first compensation signal and the first voltage signal, wherein the current reference signal is obtained by superimposing the voltage regulation signal with the first node signal.

Optionally, the first node signal represents information about the average value of the total current of the multiphase power supply relative to the phase number of the power conversion circuits that are turned on.

Optionally, the voltage regulation signal increases in a case that the first compensation signal is greater than the first voltage signal;

the voltage regulation signal decreases in a case that the first compensation signal is less than the first voltage signal.

Optionally, the voltage converter includes:

a first voltage converter configured to perform voltage conversion on the first compensation signal according to the phase number of the power conversion circuits that are turned on to obtain a second voltage signal;

a second voltage converter connected with the first voltage converter, wherein the second voltage converter is configured to perform voltage conversion on the second voltage signal according to the predetermined phase number of the power conversion circuits of the multiphase power supply to obtain the first node signal.

Optionally, the voltage regulation unit includes:

a comparator having a first input terminal for receiving the first compensation signal, a second input terminal for receiving the first voltage signal, and an output terminal for outputting a regulation signal;

a voltage regulation sub-unit receiving the regulation signal, wherein the voltage regulation sub-unit is configured to obtain the voltage regulation signal according to the regulation signal.

Optionally, the second voltage converter includes: a first operational amplifier, a second resistor, and a third resistor, wherein the second resistor and the third resistor are sequentially connected in series between an output terminal of the first operational amplifier and a reference ground;

a first input terminal of the first operational amplifier receives the second voltage signal, a second input terminal of the first operational amplifier is connected with an intermediate node between the second resistor and the third resistor, an output terminal of the first operational amplifier outputs the first node signal, the second resistor and the third resistor have a voltage division ratio of the first node signal equal to a reciprocal of the predetermined phase number of the power conversion circuits of the multiphase power supply.

Optionally, the voltage regulation sub-unit includes:

a current generation unit configure to generate a first current signal according to the regulation signal;

a first resistor having a first terminal connected with the current generation unit and a second terminal connected with the output terminal of the voltage converter, wherein the first resistor is configured to receive the first current signal to obtain the voltage regulation signal at two terminals thereof, wherein the voltage regulation sub-unit outputs the current reference signal at the first terminal of the first resistor.

Optionally, the controller includes:

N-phase control units corresponding to the N-phase power conversion circuits respectively, wherein each controller of the N-phase control units is configure to generate a peak current reference signal and/or a valley current reference signal for corresponding each of the power conversion circuits according to the current reference signal, and to obtain a control signal according to the peak current reference signal and/or the valley current reference signal of corresponding one of the N-phase power conversion circuits and an inductive current sampling signal of corresponding one of the N-phase power conversion circuits, so as to trigger and achieve on-off control of a switching device in corresponding one of the N-phase power conversion circuits.

Optionally, the controller includes:

a current reference processing unit configure to generate a peak current reference signal and/or a valley current reference signal according to the current reference signal;

N-phase control units corresponding to the N-phase power conversion circuits respectively, wherein each controller of the N-phase control units is configured to obtain a control signal according to the peak current reference signal and/or the valley current reference signal and an inductive current sampling signal of corresponding one of the N-phase power conversion circuits, so as to trigger and achieve on-off control of a switching device in corresponding one of the N-phase power conversion circuits.

According to a second aspect of the present disclosure, there is provided a multiphase power supply, including: N-phase power conversion circuits coupled in parallel, wherein N is a predetermined phase number of the multiphase power supply, and N is an integer greater than or equal to 1; and the control circuit as described above.

According to a third aspect of the present disclosure, there is provided a control method for a multiphase power supply which includes N-phase power conversion circuits, N is the predetermined phase number of the multiphase power supply, and N is an integer greater than or equal to 1, the control method includes:

obtaining a first compensation signal according to an output feedback signal of the multiphase power supply and a preset reference voltage;

obtaining a first voltage signal according to a total output current of the multiphase power supply and the predetermined phase number of the power conversion circuits of the multiphase power supply;

adjusting the first compensation signal according to a first scaling factor and the first voltage signal, so that the first compensation signal follows the first voltage signal in a steady state, and a current reference signal is obtained according to the first compensation signal and the first voltage signal;

obtaining a control signal for each phase power conversion circuit according to the current reference signal to control each phase power conversion circuit to provide a power output to a load, wherein the first scaling factor represents information about the ratio of the predetermined phase number of the power conversion circuits of the multiphase power supply and a phase number of the power conversion circuits that are turned on in the multiphase power supply.

Optionally, the first voltage signal represents information about the average value of total current of the multiphase power supply relative to the predetermined phase number of the power conversion circuits of the multiphase power supply.

Optionally, the step of obtaining the first voltage signal includes:

obtaining the first voltage signal by sampling the total current actually output from the N-phase power conversion circuits and diving the total current by N;

obtaining the first voltage signal by filtering an output current of the power conversion circuits of the predetermined phase number of the multiphase power supply.

Optionally, adjusting the first compensation signal according to a first scaling factor and the first voltage signal includes:

performing voltage conversion on the first compensation signal according to the first scaling factor to obtain a first node signal;

obtaining a voltage regulation signal according to the first compensation signal and the first voltage signal; and generating the current reference signal by superimposing the voltage regulation signal with the first node signal.

Optionally, the first node signal represents information about the average value of the total current of the multiphase power supply relative to the phase number of the power conversion circuits that are turned on.

Optionally, obtaining a voltage regulation signal according to the first compensation signal and the first voltage signal includes:

increasing the voltage regulation signal in a case that the first compensation signal is greater than the first voltage signal;

decreasing the voltage regulation signal in a case that the first compensation signal is less than the first voltage signal.

Optionally, obtaining a control signal for each phase power conversion circuit according to the current reference signal includes:

generating a peak current reference signal and/or a valley current reference signal for corresponding each of the power conversion circuits according to the current reference signal;

obtaining the control signal according to the peak current reference signal and/or the valley current reference signal and inductive current of corresponding one of the power conversion circuits.

Beneficial effects of the present disclosure at least include:

The embodiment of the present disclosure obtains the current reference signal by utilizing the first scaling factor representing the information about the ratio of the predetermined phase number of the power conversion circuits of the multiphase power supply and the phase number of the power conversion circuits that are turned on in the multiphase power supply and the first voltage signal to perform conversion adjustment on the first compensation signal, and generates the current reference signal corresponding to each phase power conversion circuit by adjusting the first compensation signal according to the predetermined phase number of the power conversion circuits being actually on in the multiphase power supply and the average value of the total output current of the multiphase power supply relative to the predetermined phase number of the power conversion circuits of the multiphase power supply, so as to improve the phase-conversion stability of the multiphase power supply, and be beneficial to achieving fast and accurate control of the multiphase power supply.

It is to be understood that both the foregoing general description and the following detailed description are exemplary and explanatory only and are not restrictive of the present disclosure, as claimed.

BRIEF DESCRIPTION OF THE DRAWINGS

FIG. 4 is a flow chart of a control method for a multiphase power supply according to an embodiment of the present disclosure.

DETAILED DESCRIPTION OF THE PRESENT DISCLOSURE

Figure 1:
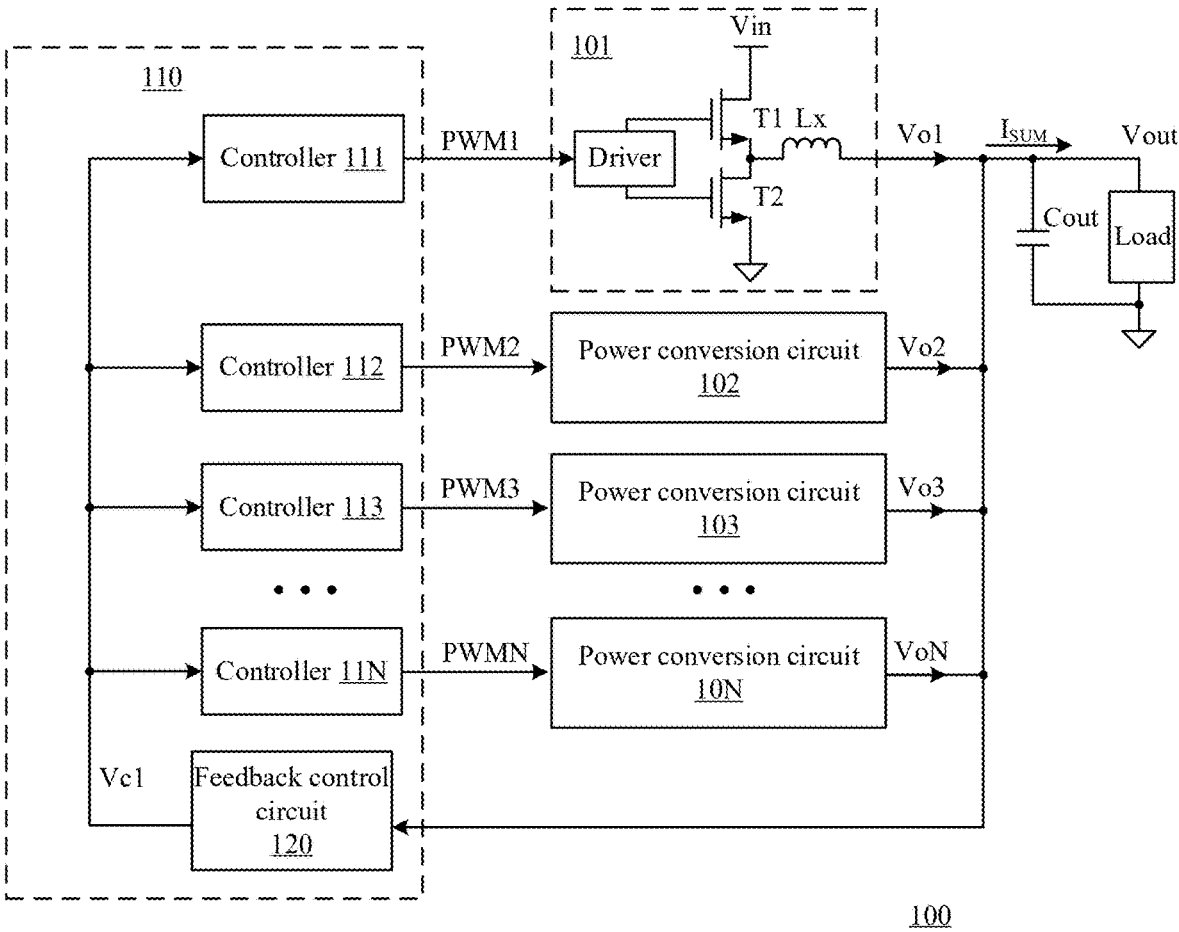
FIG. 1 is a schematic diagram of a multiphase power supply of a prior art.

For facilitating an understanding of the present disclosure, the present disclosure will now be described more fully hereinafter with reference to the accompanying drawings. Preferred embodiments of the present disclosure are shown in the drawings. The present disclosure may, however, be embodied in different forms and should not be construed as limited to the embodiments set forth herein. Rather, these embodiments are provided so that this disclosure will be thorough and complete.

It should be noted that, in this disclosure, a switching device is a transistor operating in a switching mode to provide a current path, and includes one selected from a bipolar transistor or a field effect transistor. A first terminal and a second terminal of the switching device are respectively a high potential terminal and a low potential terminal of the current path, and a control terminal of the switching device is configured to receive a driving signal to control on and off the transistor. In addition, in the present application, description of turning on and off of a power conversion circuit corresponds to turning on and off of a main switching device in the power conversion circuit that receives an input voltage, for example, turning on the power conversion circuit corresponds to turning on the main switching device in the power conversion circuit to connect an energy storage element in the circuit to an input for charging and storing energy, and starting to provide a power output to a load; turning off the power conversion circuit corresponds to turning off the main switching device in the power conversion circuit to stop an charging energy storage state of the energy storage element in the circuit, and providing the power output to the load based on a continuous current transistor.

Figure 2:
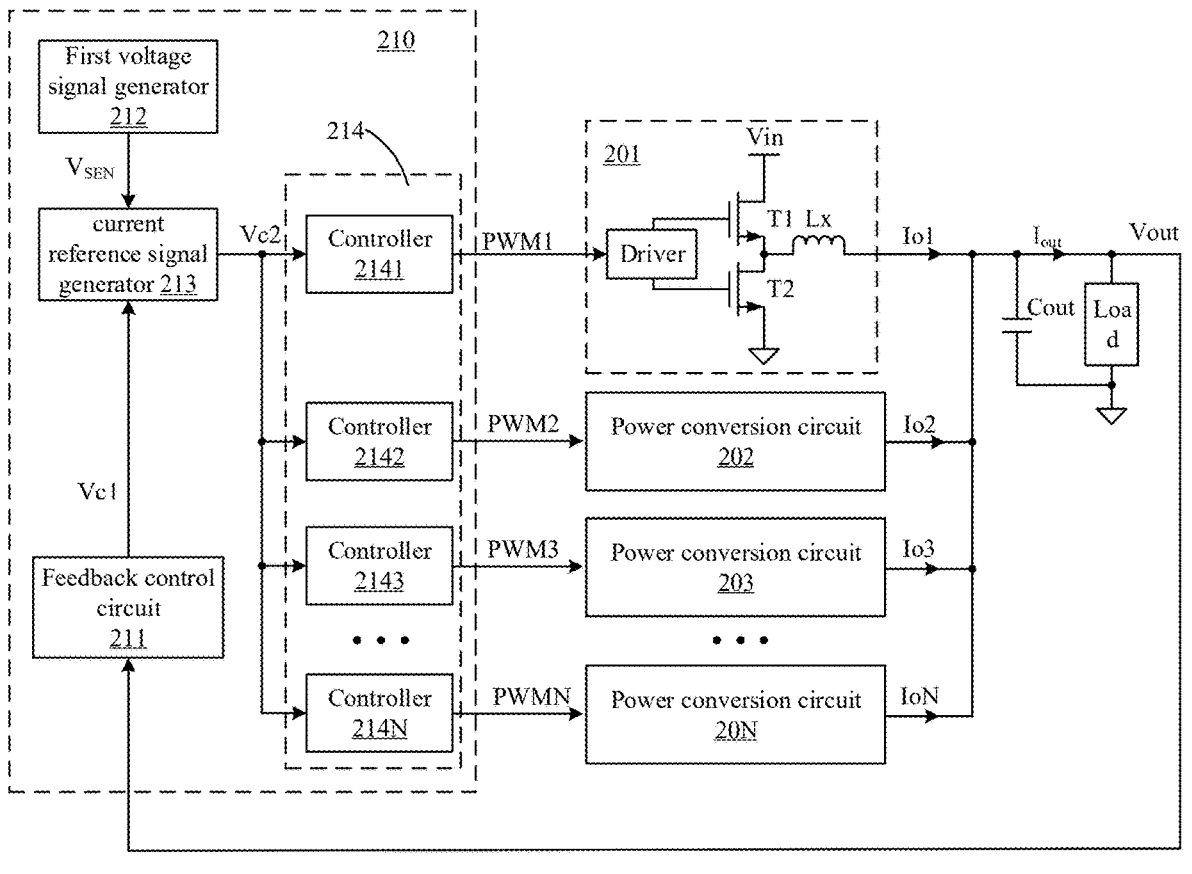
FIG. 2 is a schematic diagram of a multiphase power supply according to an embodiment of the present disclosure.

As shown in FIG. 2, the multiphase power supply disclosed in the embodiment of the present disclosure includes a control circuit for the multiphase power supply (herein, simply referred to as a control circuit) 210 and N-phase power conversion circuits 201-20N coupled in parallel. Each phase power conversion circuit in the N-phase power conversion circuits 201-20N has an input terminal coupled to an input voltage and an output coupled to a load to provide a power output. N is a predetermined phase number of the multiphase power supply, and N is an integer greater than or equal to 1.

It should be noted that the power conversion circuits shown in FIG. 2 may be understood with reference to a structure of the power conversion circuit 201 in FIG. 1. In addition, in this embodiment, each phase of inductance corresponding to each phase power conversion circuit in the N-phase power conversion circuits 201-20N may be discrete, or may be coupled to each other (for example, a first phase of inductance is coupled to a second phase of inductance; a third phase of inductance is coupled to a fourth phase of inductance, and so on). Meanwhile, although the power conversion circuits are described as having a Buck layout, technical solutions of the present disclosure may be adopted for any type of layout design, such as Boost, Flyback, Buck-Boost, Cuk, Sepic, Zeta, and the like.

The control circuit 210 is coupled to the N-phase power conversion circuits 201-20N, respectively, and the control circuit 210 is configured to adjust a first compensation signal Vc1 according to a first scaling factor (denoted as N/actphase) and a first voltage signal $V_{SEN}$, so that the first compensation signal Vc1 follows the first voltage signal $V_{SEN}$ when the multiphase power supply 200 reaches a steady state, and obtaining a current reference signal Vc2 according to the first compensation signal Vc1, and obtaining control signals PWM1-PWMN corresponding to each phase the power conversion circuits 201-20N according to the current reference signal Vc2 to control each phase the power conversion circuits to provide a power output to a load. Wherein, the first compensation signal Vc1 represents information about a difference between an output feedback signal (denoted as FB) of the multiphase power supply 200 and a preset reference voltage (denoted as Vref), the first scaling factor represents information about a ratio between the predetermined phase number N of the power conversion circuits and a phase number (herein, simply referred to as an on-phase number) of the power conversion circuits that are actually turned on in the multiphase power supply 200, and the first voltage signal $V_{SEN}$ represents information (denoted as Iout/N) about an average value of a total output current of the multiphase power supply 200 relative to the phases number N that is arranged. When the multiphase power supply 200 reaches the steady state, both the first compensation signal Vc1 and the first voltage signal $V_{SEN}$ are in a steady state, and first compensation signal Vc1 and the first voltage signal V are equal or very close.

Optionally, the first voltage signal $V_{SEN}$ is obtained by sampling the total current Iout output from the N-phase power conversion circuits and diving the total current by N; or the first voltage signal $V_{SEN}$ is obtained by filtering an output current of the power conversion circuits of the predetermined phase number of the multiphase power supply.

In the present disclosure, the predetermined phase number N of the power conversion circuits of the multiphase power supply 200 is greater than or equal to a phase number of the power conversion circuits that are turned on, and the first scaling factor is greater than or equal to 1.

In this embodiment, the control circuit 210 further includes: a feedback control circuit 211, a first voltage signal generator 212, a current reference signal generator 213, and a controller 214.

Wherein, a first input terminal of the feedback control circuit 211 is connected with outputs of the N-phase power conversion circuits 201-20N, respectively, to receive the output feedback signal FB representing an output voltage Vout of the multiphase power supply 200, a second input terminal of the feedback control circuit 211 receives a preset reference voltage signal Vref, and an output of the feedback control circuit 211 is connected with the current reference signal generator 213 to output the first compensation signal Vc1 to the current reference signal generator 213. Exemplarily, the output feedback signal FB may be obtained by dividing the output voltage Vout of the multiphase power supply 200 by a resistance voltage-dividing sampler. In some possible embodiments of the present disclosure, the feedback control circuit 211 specifically includes an error amplifying circuit and a compensating circuit, a first input terminal of the error amplifying circuit receives the reference voltage signal Vref, a second input terminal of the error amplifying circuit receives the output feedback signal FB, and an output of the error amplifying circuit is connected with the compensating circuit and outputs the first compensating signal Vc1.

Optionally, the first voltage signal generator 212 in this embodiment may be configured to sample an output current of each phase power conversion circuits that are turned on among the N-phase power conversion circuits to obtain a plurality of sampling signals, respectively, and generates the first voltage signal $V_{SEN}$ by adding the plurality of sampling signals and dividing an adding result by N. The first voltage signal generator 212 may also be configured to directly sample a total actual output circuit Iout of the multiphase power supply 200 and then dividing it by N to generate the first voltage signal $V_{SEN}$. Preferably, the first voltage signal generator 212 may also generate the first voltage signal $V_{SEN}$ by filtering an output current, such as $I_{O1}$-$I_{ON}$, of each phase power conversion circuit (i.e. each phase power conversion circuit is predetermined) among the N-phase power conversion circuit, so as to obtain a current average value representing the multiphase power supply 200, and in which the output current corresponds to a phase not being on is zero. The present disclosure does not limit this.

Optionally, the first voltage signal $V_{SEN}$ may also be obtained by a preset arrangement.

The current reference signal generator 213 is configured to adjust the first compensation signal Vc1 according to the first scaling factor N/actphase and the first voltage signal $V_{SEN}$, so that the first compensation signal Vc1 follows the first voltage signal $V_{SEN}$ in a steady state, and obtaining the current reference signal Vc2 accordingly.

Figure 3:
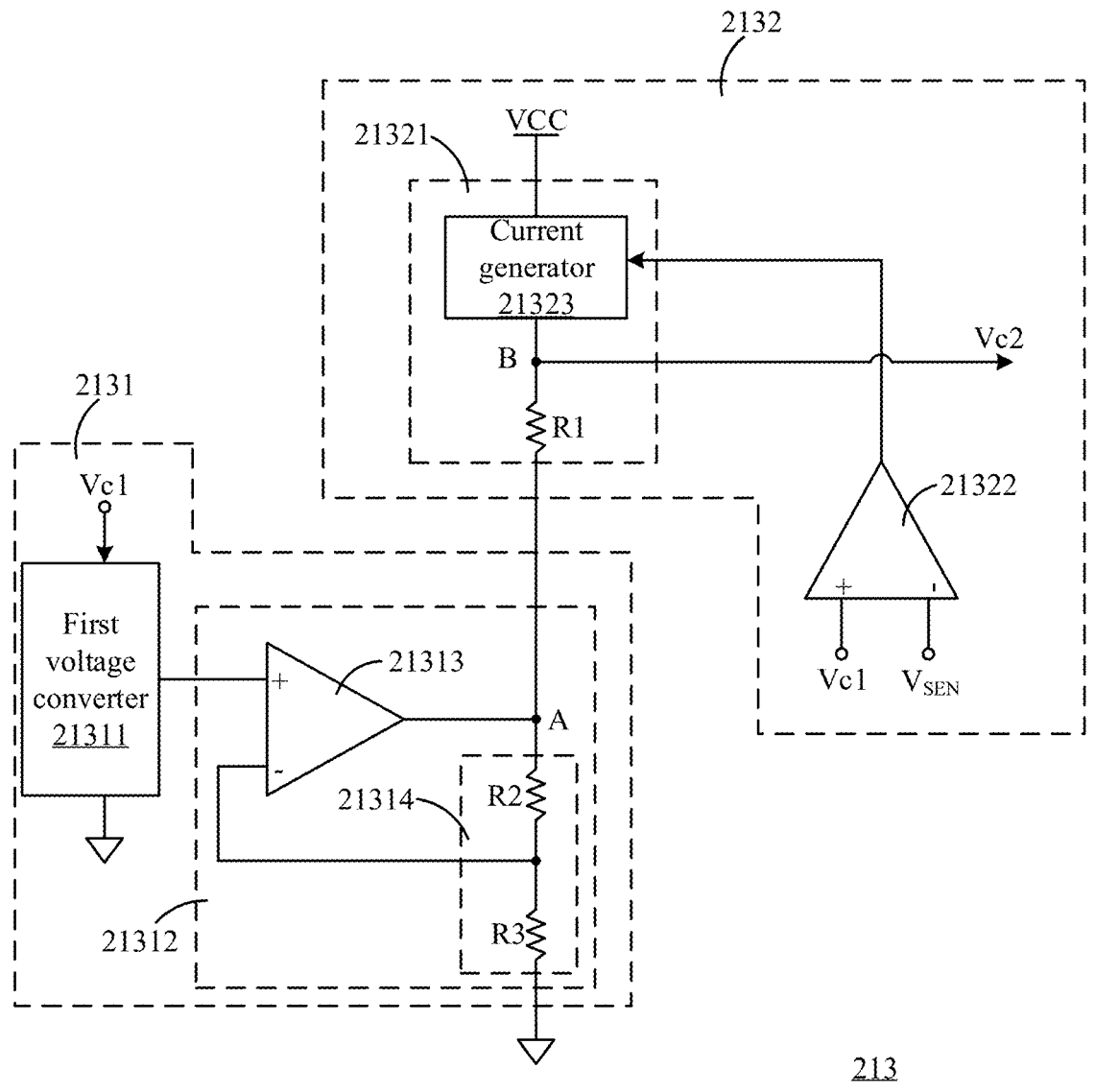
FIG. 3 is a schematic diagram of a current reference signal generator of FIG. 2.

Exemplarily, as shown in FIG. 3, the current reference signal generator 213 in the present embodiment includes: a voltage converter 2131 and a voltage regulation unit 2132.

The voltage converter 2131 is configured to receive the first compensation signal Vc1, and performing voltage conversion on the first compensation signal Vc1 according to the first scaling factor N/actphase to obtain a first node signal. In this embodiment, the voltage converter 2131 further includes: a first voltage converter 21311 and a second voltage converter 21312.

Wherein, the first voltage converter 21311 is configured to perform voltage conversion on the first compensation signal Vc1 according to the phase number act_phase of the power conversion circuits that are turned on in the multiphase power supply 200, so as to obtain a second voltage signal. Exemplarily, the first voltage converter 21311 may perform voltage conversion on the first compensation signal Vc1 by using a first resistance voltage divider, set a resistance value of each resistor in the first resistance voltage divider reasonably, and adjust the resistance value of one or more resistors in the first resistance voltage divider in real time according to monitoring an operating state of the power conversion circuits of each phase in the multiphase power supply 200 (for example, achieved by arranging at least one rheostat in the first resistance voltage divider, or connecting a switch to each series resistor in parallel in the first resistance voltage divider), so that a voltage division coefficient of the first resistance voltage divider is equal to a reciprocal of the phase number of the power conversion circuits that are turned on in the multiphase power supply 200, that is, 1/actphase. In other examples of the present disclosure, a multiplier or a divider may also be used to performing voltage conversion on the first compensation signal Vc1, for example, an operation coefficient of the multiplier or the divider is adjusted by a processor according to monitoring the operation state of the power conversion circuits of each phase in the multiphase power supply 200, so that a reciprocal of the operation coefficient of the multiplier or the operation coefficient of the divider is equal to 1/act_phase.

The second voltage converter 21312 is connected with the first voltage converter 21311, and the second voltage converter 21312 is configured to perform voltage conversion on the second voltage signal output from the first voltage converter 21311 according to 1/N, which is a reciprocal of the predetermined phase number of the power conversion circuits of the multiphase power supply in the multiphase power supply 200, and obtaining a first node signal (denoted as $V_A$). Exemplarily, the second voltage converter 21312 further includes a first operational amplifier 21313 and a second resistor divider 21314 including a second resistor R2 and a third resistor R3. The second resistor R2 and the third resistor R3 are sequentially connected in series between an output terminal of the first operational amplifier 21313 and a reference ground; a first input terminal of the first operational amplifier 21313 receives the second voltage signal, a second input terminal of the first operational amplifier 21313 is connected with a middle intermediate node between the second resistor R2 and the third resistor R3, and an output terminal of the first operational amplifier 21313 outputs the first node signal $V_A$. Wherein, a voltage division ratio of the second resistor R2 and the third resistor R3 to the first node signal VA, that is a voltage division ratio of the second resistor divider 21314, is equal to 1/N which is the reciprocal of the predetermined phase number of the power conversion circuits of the multiphase power supply in the multiphase power supply 200. It is understood that the voltage dividing ratio of the second resistance voltage divider 21314 may be preset according to 1/N.

As shown in FIG. 3, an input-output relationship of the voltage converter 2131 based on a connection structure of which is as follows:

$$V_A = Vc1 * \frac{1}{act\_phace} * N = Vc1 * \frac{N}{act\_phace}. \tag{1}$$

It could be understood that, since the first scaling factor represents the information about the ratio of the predetermined phase number N of the power conversion circuits of the multiphase power supply and the phase number act_phase of the power conversion circuits that are actually turned on in the multiphase power supply 200, the voltage converter 2131 is capable of establishing connection between the first compensation signal Vc1 and act_phase, so that the first compensation signal Vc1 may be adjusted according to the phase number act_phase of the power conversion circuits that are actually turned on in the multiphase power supply 200 during subsequent voltage adjustment, so as to obtain the current reference signal Vc2 related to the phase number act_phase of the power conversion circuits that are actually turned on in the multiphase power supply 200 to trigger and control each phase power conversion circuit, and adjust the output current of each phase power conversion circuit correspondingly in a fast and timely manner when the phase number act_phase of the power conversion circuits that are actually turned on in the multiphase power supply 200 changes, so that an average value of the output current of each phase power conversion circuit is constant, which is further beneficial to achieve fast and accurate adjustment of the output current Iout of the multiphase power supply 200.

Further, the voltage regulation unit 2132 is connected with the voltage converter 2131, and the voltage regulation unit 2132 is configured to obtain a voltage regulation signal according to the first compensation signal Vc1 and the first voltage signal $V_{SEN}$. Wherein, the current reference signal Vc2 is obtained by superimposing the voltage regulation signal with the first node signal $V_A$. For example, the current reference signal Vc2 is equal to a superimposed signal of the voltage regulation signal and the first node signal $V_A$.

In this embodiment, the voltage regulator 2132 further includes: a comparator 21322 and a voltage regulation sub-unit 21321. A first input terminal of the comparator 21322 receives the first compensation signal Vc1, a second input terminal of the comparator 21322 receives the first voltage signal $V_{SEN}$, and an output of the comparator 21322 outputs a regulation signal. The voltage regulation sub-unit 21321 receives the regulation signal, and the voltage regulation sub-unit 21321 is configured to obtain a voltage regulation signal according to the regulation signal, and adjusting the first node signal $V_A$ according to the voltage regulation signal so as to generate the current reference signal Vc2.

In some examples of the present disclosure, the voltage regulation signal increases in a case that the first compensation signal Vc1 is greater than the first voltage signal $V_{SEN}$; the voltage regulation signal decreases in a case that the first compensation signal Vc1 is less than the first voltage signal $V_{SEN}$. The first compensation signal Vc1 and the first voltage signal $V_{SEN}$ achieves dynamic balancing under the steady state through above dynamic adjustment.

The voltage regulation sub-unit 21321 further includes: a current generation unit 21323 and a first resistor R1. The current generation unit 21323 is configure to generate a first current signal according to the regulation signal output from the comparator 21322; a first terminal of the first resistor R1 is connected with the current generation unit 21323, a second terminal of the first resistor R1 is connected with the output terminal of the voltage converter 2131, and the first resistor R1 is configured to receive the first current signal to obtain a voltage regulation signal at two terminals thereof. Meanwhile, the voltage regulation sub-unit 21321 further outputs the current reference signal Vc2 at the first terminal of the first resistor R1, i.e., at a node B.

Exemplarily, the regulation signal may be a High/low level signal representing a relative magnitude relationship of the first compensation signal Vc1 and the first voltage signal $V_{SEN}$; and the current generation unit 21323 may implement a corresponding function based on a corresponding regulation signal, for example, by use of a voltage controlled current source or a digital-to-analog converter.

Exemplarily, the current generation unit 21323 is configured as a digital-to-analog converter (DAC). When the first compensation signal Vc1 is greater than the first voltage signal $V_{SEN}$, the comparator 21322 outputs a high-level signal to trigger the DAC to count, and generates a corresponding first current signal according to a count value to adjust the output current Iout of the multiphase power supply 200; When the first voltage signal $V_{SEN}$ reaches the first compensation signal Vc1, the comparator 21322 outputs a low-level signal to trigger the DAC to suspend counting, and generates a corresponding first current signal according to a count value to maintain dynamic balancing of the first voltage signal $V_{SEN}$ And the first compensation signal Vc1.

In the present embodiment, since the predetermined phase number N of the power conversion circuits of the multiphase power supply in the multiphase power supply 200 is constant, the first voltage signal $V_{SEN}$ obtained has a relatively high stability, and when the multiphase power supply 200 reaches the steady state, the first compensation signal Vc1 is equal to the first voltage signal $V_{SEN}$, so as to attenuate or even avoid violent jitter of the first compensation signal Vc1 in phase-conversion control of the multiphase power supply 200, and be beneficial to improving an output stability of the multiphase power supply 200.

Based on an operating principle of the voltage regulation sub-unit 2132, it should be known that $$Vc2 = V_B = V_A + R1 * I_{DAC} \qquad (2),$$

wherein, $I_{DAC}$ is the first current signal generated by the current generation unit 21323.

And when the multiphase power supply 200 reaches the steady state, $$Vc1 = V_{SEN} = \frac{Iout * R}{N}, \qquad (3)$$

Wherein, R is a resistance value of a sampling resistor in the first voltage signal generator 212.

By combining above equations (1), (2) and (3), it may be obtained that $$V_A = Vc1 * \frac{1}{act\_phace} * N = \frac{Iout * R}{act\_phase}. \qquad (4)$$

$$Vc2 = \frac{Iout * R}{N} * \frac{1}{act\_phace} * N + R1 * I_{DAC} = \frac{Iout * R}{act\_phase} + R1 * I_{DAC}. \qquad (5)$$

It may be obtained that the first node signal $V_A$ may be used to represent information about the average value of the total current Iout of the multiphase power supply relative to the phase number act_phase of the power conversion circuits that are turned on. The current reference signal Vc2 may be used as peak value reference of inductive current, on a basis of which a fixed voltage value is subtracted to obtain valley value reference, and the fixed voltage value and $R1 * I_{DAC}$ may be set to cancel each other, so that the current average value is only related to for the inductor, so as to achieve precise control of inductor current according to predetermined phase number actually being on.

Therefore, when one or more phases of the N-phase power conversion circuits are turned off or do not operate due to faults, the current reference signal Vc2 corresponding to each phase remaining power conversion circuits is capable of being quickly adjusted to a value corresponding to the phase number act_phase of the power conversion circuits that are actually turned on, so as to achieve accurately adjustment of an average value of the output current of each phase power conversion circuits that are actually turned on and the total output current Iout of the multiphase power supply 200, so as to ensure that the output current of each phase power conversion circuit is a required current when a system is stable. And in the phase-conversion change process of the system, the violent jitter of the first compensation signal Vc1 is attenuate or even avoid by performing dynamic adjustment on the first compensation signal Vc1 based on the relatively stable first voltage signal $V_{SEN}$, which is beneficial to enhancing the phase-cut stability of the multiphase power supply 200.

The controller 214 includes N-phase control units 2141-214N, the N-phase control units 2141-214N are in one-to-one correspondence with the N-phase power conversion circuits 201-20N, and the controller 214 is configured to obtain control signals PWM1-PWMN corresponding to each phase power conversion circuit according to the current reference signal Vc2 of each phase power conversion circuit generated by the current reference signal generator 213, so as to control each phase the power conversion circuit to provide power output to the load.

In this embodiment, the current reference signal Vc2 may be processed and then converted into a peak current reference signal and/or a valley current reference signal for controlling the peak value and/or the valley value of the inductor current of corresponding one of the power conversion circuits.

Optionally, in some possible embodiments of the present disclosure, conversion of the current reference signal Vc2 is performed separately for each phase of the controller. That is, each of the N-phase control units 2141-214N is configured is configure to generate a peak current reference signal and/or a valley current reference signal for corresponding each of the power conversion circuits according to the current reference signal, and to obtain a control signal according to the peak current reference signal and/or the valley current reference signal of corresponding one of the N-phase power conversion circuits and an inductive current sampling signal of corresponding one of the N-phase power conversion circuits, so as to trigger and achieve on-off control of switching devices (including switching device T1 and switching device T2) in corresponding one of the N-phase power conversion circuits. Exemplarily, taking a Mth phase controller 214M of the N-phase control units 2141-214N as an example, the Mth phase controller 214M may be configured to generate an Mth peak current reference signal and/or an Mth valley current reference signal according to the current reference signal Vc2, and obtain an Mth control signal according to the Mth peak current reference signal and/or the Mth valley current reference signal and the Mth inductor current sampling signal, so as to trigger and achieve on-off control of the switching device in the Mth phase power conversion circuit. Wherein M is any integer from 1 to N, and the Mth inductor current sampling signal represents inductor current of the Mth phase power conversion circuit 20M. Therefore, accurate control over each phase the power conversion circuit is achieved. In addition, based on a structure and a working principle of the controller 214, a current sharing control of the N-phase power conversion circuits 201-20N in the multiphase power supply 200 is also facilitated.

In other possible embodiments of the present disclosure, the controller 214 further includes a current reference processing unit, and a conversion processing of the current reference signal Vc2 is performed by the current reference processing unit in a unified manner. That is, the current reference processing unit may generate the peak current reference signal and/or the valley current reference signal according to the current reference signal Vc2. And each of the N-phase control units 2141-214N is configured to obtain a control signal according to the peak current reference signal and/or the valley current reference signal generated by the current reference processing unit and the inductor current sampling signal of corresponding one of the power conversion circuits, so as to trigger on-off control of the switching device in corresponding one of the power conversion circuits. Exemplarily, taking the Mth phase controller 214M of the N-phase control units 2141-214N as an example, the Mth phase controller 214M may be configured to obtain the Mth control signal according to the peak current reference signal and/or the valley current reference signal generated by the current reference processing unit and the Mth inductor current sampling signal, so as to trigger and achieve on-off control on the switching device in the Mth phase power conversion circuit 20M. And M is any integer from 1 to N, and the M-th inductive current sampling signal represents the inductive current of the M-th phase power conversion circuit.

In this embodiment, since the current reference signal Vc2 output from the current reference signal generator 213 is output to each controller at the same time, in the present disclosure, only one current reference signal generator 213 is needed to be provided to achieve adaptive adjustment of the current reference signals corresponding to the power conversion circuits of all phases, so that the circuit structure is simple.

Further, the multiphase power supply 200 further includes: a plurality of drivers and a logic trigger. The plurality of drivers is configure to generate driving signals according to the control signals PWM1-PWMN corresponding-ingly generated by the N-phase control units 2141-214N in the control circuit 210, and sending the driving signals to control terminals of the switching devices in corresponding one of the power conversion circuits. Exemplarily, the plurality of drivers is respectively integrated in each phase power conversion circuit, or the plurality of drivers are integrated in the control circuit 210, and each driver corresponds to one controller respectively.

The logic trigger is configured to control on-states of the plurality of controllers 2121-212N and/or the plurality of drivers as required, and further controlling on-state of each phase power conversion circuit of the N-phase power conversion circuits 201-20N, so as to control the predetermined phase number of the power conversion circuits actually being on in the multiphase power supply 200.

Further, the present disclosure also discloses a control method for a multiphase power supply, which may be applied to the multiphase power supply 200 as shown in FIGS. 2 to 3. Specifically, as shown in FIG. 4, the control method includes performing steps of:

in step S1, obtaining a first compensation signal according to an output feedback signal of the multiphase power supply and a preset reference voltage. Wherein the first compensation signal represents difference information between the output feedback signal of the multiphase power supply and the preset reference voltage.

In this embodiment, a step for obtaining the first compensation signal includes: sampling an output voltage of the multiphase power supply to obtain a second sampling signal; performing error amplification on the second sampling signal and the preset reference voltage signal to obtain an error amplification signal; and compensating the error amplification signal to obtain the first compensation signal.

In step S2, obtaining a first voltage signal according to a total output current of the multiphase power supply and a predetermined phase number of the power conversion circuits of the multiphase power supply. Wherein the first voltage signal represents information about the average value of the total output current of the multiphase power supply relative to the predetermined phase number of the power conversion circuits of the multiphase power supply.

In the present disclosure, the predetermined phase number of the power conversion circuits of the multiphase power supply in the multiphase power supply 200 is greater than or equal to the phase number of the power conversion circuits that are turned on, and the phase number of the power conversion circuits that are turned on in the multiphase power supply 200 is less than or equal to N. And in some preferred embodiments, the predetermined phase number of the power conversion circuits of the multiphase power supply in the multiphase power supply 200 may be set equal to N.

A step for obtaining the first voltage signal includes: the first voltage signal is obtained by sampling the total current actually output from the N-phase power conversion circuits and diving the total current by N; or the first voltage signal is obtained by filtering an output current of the power conversion circuits of a predetermined phase number of the multiphase power supply.

In step S3, adjusting the first compensation signal according to a first scaling factor and the first voltage signal, so that the first compensation signal follows the first voltage signal in a steady state, and a current reference signal is obtained according to the first compensation signal and the first voltage signal. The first scaling factor represents information about the ratio of the predetermined phase number of the power conversion circuits of the multiphase power supply and the phase number of the power conversion circuits that are turned on in the multiphase power supply.

In this embodiment, step S3 further includes: obtaining a first node signal by performing voltage conversion on the first compensation signal according to the first scaling factor; obtaining a voltage regulation signal according to the first compensation signal and the first voltage signal; generating a current reference signal by superimposing the voltage regulation signal with the first node signal. Specifically, the voltage regulation signal increases in a case that the first compensation signal is greater than the first voltage signal; the voltage regulation signal decreases in a case that the first compensation signal is less than the first voltage signal. The first compensation signal Vc1 and the first voltage signal $V_{SEN}$ achieves dynamic balancing under the steady state through above dynamic adjustment. Wherein the first node signal represents information about the average value of the total current of the multiphase power supply relative to the phase number of the power conversion circuits that are turned on.

In step S4, obtaining a control signal for each phase power conversion circuit according to the current reference signal, so as to control each phase power conversion circuit to provide power output to a load.

In this embodiment, step S4 further includes: generating a peak current reference signal and/or a valley current reference signal for corresponding each of the power conversion circuits according to the current reference signal; obtaining the control signal according to the peak current reference signal and/or the valley current reference signal and inductive current of corresponding one of the power conversion circuits.

In specific implementation, for specific implementation of each step in the control method for the multiphase power supply, reference may be made to each embodiment of the multiphase power supply 200, and details are not described herein again.

Finally, it should be noted that: it should be understood that the above examples are only for clearly illustrating the present disclosure and are not intended to limit the embodiments. Other variations and modifications will be apparent to persons skilled in the art in light of the above description. This need not be, nor should it be exhaustive of all embodiments. And obvious variations or modifications of the present disclosure may be made without departing from the scope of the present disclosure.

The invention claimed is:

1. A control circuit for a multiphase power supply which comprises N-phase power conversion circuits, N is a predetermined phase number of the multiphase power supply, and N is an integer greater than or equal to 1, comprising:
   a current reference signal generator configured to adjust a first compensation signal according to a first scaling factor and a first voltage signal, so that the first compensation signal follows the first voltage signal in a steady state, and a current reference signal is obtained according to the first compensation signal and the first voltage signal;
   a controller configured to obtain a control signal for each phase power conversion circuit according to the current reference signal to control each phase power conversion circuit to provide a power output to a load,
   wherein the first compensation signal represents a difference information between an output feedback signal of the multiphase power supply and a preset reference voltage, the first scaling factor represents information about a ratio of the predetermined phase number of the power conversion circuits and a phase number of the power conversion circuits that are turned on in the multiphase power supply, and the first voltage signal represents information about an average value of a total current of the multiphase power supply relative to the predetermined phase number of the power conversion circuits,
   the current reference signal generator comprises:
   a voltage converter for receiving the first compensation signal, wherein the voltage converter is configured to perform voltage conversion on the first compensation signal according to the first scaling factor to obtain a first node signal;
   a voltage regulation unit connected with an output of the voltage converter, wherein the voltage regulation unit is configured to obtain a voltage regulation signal according to the first compensation signal and the first voltage signal,
   wherein the current reference signal is obtained by superimposing the voltage regulation signal with the first node signal.

2. The control circuit according to claim 1, wherein the first voltage signal is obtained by sampling the total current actually output from the N-phase power conversion circuits and diving the total current by N;
   or the first voltage signal is obtained by filtering an output current of the power conversion circuits of the predetermined phase number of the multiphase power supply.

3. The control circuit according to claim 1, wherein the predetermined phase number of the power conversion circuits of the multiphase power supply is equal to or greater than the phase number of the power conversion circuits that are turned on in the multiphase power supply.

4. The control circuit according to claim 1, wherein the first node signal represents information about the average value of the total current of the multiphase power supply relative to the phase number of the power conversion circuits that are turned on.

5. The control circuit according to claim 1, wherein the voltage regulation signal increases in a case that the first compensation signal is greater than the first voltage signal; the voltage regulation signal decreases in a case that the first compensation signal is less than the first voltage signal.

6. The control circuit according to claim 1, wherein the voltage converter comprises:
   a first voltage converter configured to perform voltage conversion on the first compensation signal according to the phase number of the power conversion circuits that are turned on to obtain a second voltage signal;
   a second voltage converter connected with the first voltage converter, wherein the second voltage converter is configured to perform voltage conversion on the second voltage signal according to the predetermined phase number of the power conversion circuits of the multiphase power supply to obtain the first node signal.

7. The control circuit according to claim 6, wherein the second voltage converter comprises: a first operational amplifier, a second resistor, and a third resistor,
   wherein the second resistor and the third resistor are connected in series between an output terminal of the first operational amplifier and a reference ground;
   a first input terminal of the first operational amplifier receives the second voltage signal, a second input terminal of the first operational amplifier is connected with an intermediate node between the second resistor and the third resistor, and the output terminal of the first operational amplifier outputs the first node signal,
   the second resistor and the third resistor have a voltage division ratio of the first node signal equal to a reciprocal of the predetermined phase number of the power conversion circuits of the multiphase power supply.

8. The control circuit according to claim 1, wherein the voltage regulation unit comprises:
   a comparator having a first input terminal for receiving the first compensation signal, a second input terminal for receiving the first voltage signal, and an output terminal for outputting a regulation signal;
   a voltage regulation sub-unit receiving the regulation signal, wherein the voltage regulation sub-unit is configured to obtain the voltage regulation signal according to the regulation signal.

9. The control circuit according to claim 8, wherein the voltage regulation sub-unit comprises:
   a current generation unit configured to generate a first current signal according to the regulation signal;
   a first resistor having a first terminal connected with the current generation unit and a second terminal connected with the output terminal of the voltage converter, wherein the first resistor is configured to receive the first current signal to obtain the voltage regulation signal at two terminals thereof, wherein the voltage regulation sub-unit outputs the current reference signal at the first terminal of the first resistor.

10. The control circuit according to claim 1, wherein the controller comprises:

N-phase control units corresponding to the N-phase power conversion circuits respectively, wherein each controller of the N-phase control units is configure to generate a peak current reference signal and/or a valley current reference signal for corresponding each of the power conversion circuits according to the current reference signal, and to obtain the control signal according to the peak current reference signal and/or the valley current reference signal of corresponding one of the N-phase power conversion circuits and an inductive current sampling signal of corresponding one of the N-phase power conversion circuits, so as to trigger and achieve on-off control of a switching device in corresponding one of the N-phase power conversion circuits.

11. The control circuit according to claim 1, wherein the controller comprises:

a current reference processing unit configured to generate a peak current reference signal and/or a valley current reference signal according to the current reference signal;

N-phase control units corresponding to the N-phase power conversion circuits respectively, wherein each controller of the N-phase control units is configured to obtain the control signal according to the peak current reference signal and/or the valley current reference signal and an inductive current sampling signal of corresponding one of the N-phase power conversion circuits, so as to trigger and achieve on-off control of a switching device in corresponding one of the N-phase power conversion circuits.

12. A multiphase power supply, comprising:

N-phase power conversion circuits coupled in parallel; and the control circuit according to claim 1, wherein N is a predetermined phase number of the multiphase power supply, and N is an integer greater than or equal to 1.

13. A control method for a multiphase power supply which comprises N-phase power conversion circuits, N is a predetermined phase number of the multiphase power supply, and N is an integer greater than or equal to 1, comprising:

obtaining a first compensation signal according to an output feedback signal of the multiphase power supply and a preset reference voltage;

obtaining a first voltage signal according to a total output current of the multiphase power supply and the predetermined phase number of the power conversion circuits of the multiphase power supply;

adjusting the first compensation signal according to a first scaling factor and the first voltage signal, so that the first compensation signal follows the first voltage signal in a steady state, and a current reference signal is obtained according to the first compensation signal and the first voltage signal;

obtaining a control signal for each phase power conversion circuit according to the current reference signal to control each phase power conversion circuit to provide a power output to a load, wherein the first scaling factor represents information about the ratio of the predetermined phase number of the power conversion circuits of the multiphase power supply and a phase number of the power conversion circuits that are turned on in the multiphase power supply, adjusting the first compensation signal according to the first scaling factor and the first voltage signal comprises:

performing voltage conversion on the first compensation signal according to the first scaling factor to obtain a first node signal;

obtaining a voltage regulation signal according to the first compensation signal and the first voltage signal; and generating the current reference signal by superimposing the voltage regulation signal with the first node signal.

14. The control method according to claim 13, wherein the first voltage signal represents information about the average value of total current of the multiphase power supply relative to the predetermined phase number of the power conversion circuits of the multiphase power supply.

15. The control method according to claim 13, wherein the step of obtaining the first voltage signal comprises:

obtaining the first voltage signal by sampling the total current actually output from the N-phase power conversion circuits and diving the total current by N; or obtaining the first voltage signal by filtering an output current of the power conversion circuits of the predetermined phase number of the multiphase power supply.

16. The control method according to claim 13, wherein the first node signal represents information about the average value of the total current of the multiphase power supply relative to the phase number of the power conversion circuits that are turned on.

17. The control method according to claim 13, wherein obtaining the voltage regulation signal according to the first compensation signal and the first voltage signal comprises: increasing the voltage regulation signal in a case that the first compensation signal is greater than the first voltage signal; decreasing the voltage regulation signal in a case that the first compensation signal is less than the first voltage signal.

18. The control method according to claim 13 wherein obtaining the control signal for each phase power conversion circuit according to the current reference signal comprises:

generating a peak current reference signal and/or a valley current reference signal for corresponding each of the power conversion circuits according to the current reference signal;

obtaining the control signal according to the peak current reference signal and/or the valley current reference signal and inductive current of corresponding each of the power conversion circuits.

* * * * *